(12) United States Patent
Awaji et al.

(10) Patent No.: US 9,019,591 B2
(45) Date of Patent: Apr. 28, 2015

(54) BURST MODE RARE EARTH-DOPED FIBER AMPLIFIER

(75) Inventors: Yoshinari Awaji, Koganei (JP); Hideaki Furukawa, Koganei (JP); Naoya Wada, Koganei (JP); Ray Man, Kowloon (HK); Peter Chan, Kowloon (HK); Eddie Kong, Kowloon (HK)

(73) Assignees: National Institute of Information and communications Technology, Tokyo (JP); Amonics Limited, Kowloon (HK)

( * ) Notice: Subject to any disclaimer, the term of this patent is extended or adjusted under 35 U.S.C. 154(b) by 804 days.

(21) Appl. No.: 12/530,784

(22) PCT Filed: Mar. 12, 2008

(86) PCT No.: PCT/JP2008/000549
§ 371 (c)(1),
(2), (4) Date: Oct. 21, 2009

(87) PCT Pub. No.: WO2008/129778
PCT Pub. Date: Oct. 30, 2008

(65) Prior Publication Data
US 2010/0221012 A1 Sep. 2, 2010

(30) Foreign Application Priority Data

Mar. 12, 2007 (JP) ................................. 2007-061784
Apr. 30, 2007 (JP) ................................. 2007-120398
Feb. 7, 2008 (JP) ................................. 2008-027372

(51) Int. Cl.
*H04B 10/17* (2006.01)
*H04B 10/296* (2013.01)
(Continued)

(52) U.S. Cl.
CPC ........... *H04B 10/296* (2013.01); *H01S 3/06729* (2013.01); *H01S 3/06758* (2013.01); *H01S 3/1608* (2013.01); *H04B 10/2941* (2013.01)

(58) Field of Classification Search
CPC .............. H04B 10/296; H04B 10/2941; H01S 3/06729; H01S 3/06758; H01S 3/1608
USPC ............................................ 359/337.1, 341.1
See application file for complete search history.

(56) References Cited

U.S. PATENT DOCUMENTS 5,125,066 A * 6/1992 Ishiguro et al. ............... 385/142
5,161,050 A * 11/1992 Grasso et al. ............. 359/341.32
(Continued)

FOREIGN PATENT DOCUMENTS

JP 4-212131 A 8/1992
JP 4-291972 A 10/1992
(Continued)

OTHER PUBLICATIONS

I. Bibac, Simulation of Photonic Devices—L-Band Amplifier, Journal of Optoelectronics and Advance Materials, Mar. 2001, vol. 3, No. 1, pp. 51-58.

*Primary Examiner* — Eric Bolda
(74) *Attorney, Agent, or Firm* — Pyprus Pte Ltd

(57) ABSTRACT

It is an object of the present invention to provide a rare earth doped fiber whose transient response is suppressed and an optical amplifier for optical packet communication having a good characteristic even if there is little traffic.
The above-mentioned problem is solved by an optical amplifier for optical packet communication comprising a first rare earth doped fiber (EDFA) having an active region whose diameter is between 3.4 μm and 10 μm, inclusive, an intermediate gain equalizing filter, and a second EDF, wherein the first EDFA is shorter than the second EDFA, and wherein the intermediate gain equalizing filter adjusts the intensity of each wavelength channel so as to equalize the light intensity of each wavelength channel having transmitted through the second EDF.

3 Claims, 16 Drawing Sheets

(51) Int. Cl.
*H04B 10/294* (2013.01)
*H04B 10/12* (2006.01)
*H01S 3/067* (2006.01)
*H01S 3/16* (2006.01)

(56) References Cited

U.S. PATENT DOCUMENTS 5,400,350 A * 3/1995 Galvanauskas ............... 372/20
5,617,244 A * 4/1997 Percival et al. ............ 359/341.5
6,236,498 B1 * 5/2001 Freeman et al. ............ 359/337.1
2007/0019285 A1 * 1/2007 Tamaoki et al. ......... 359/341.41

FOREIGN PATENT DOCUMENTS

| | | |
|---|---|---|
| JP | 6-508430 A | 9/1994 |
| JP | 2000-252923 A | 9/2000 |
| JP | 2002-504756 A | 2/2002 |
| JP | 2006-120958 A | 5/2006 |
| JP | 2007-53350 A | 3/2007 |

* cited by examiner

1530nm    1550nm    1570nm

Fig.12
Fig.12(a)
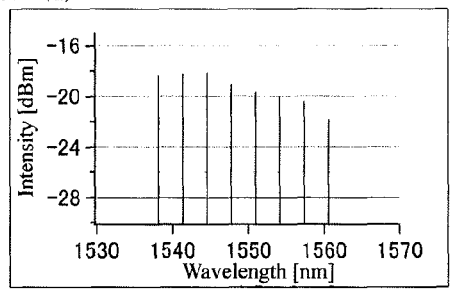
Fig.12(b)
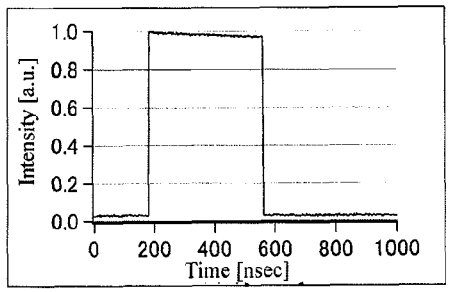

Fig.13
Fig.13(a)
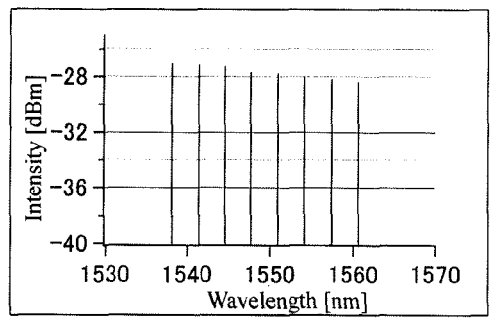
Fig.13(b)
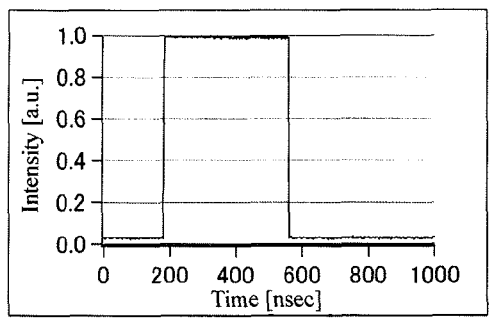

Fig.15
Fig.15(a)
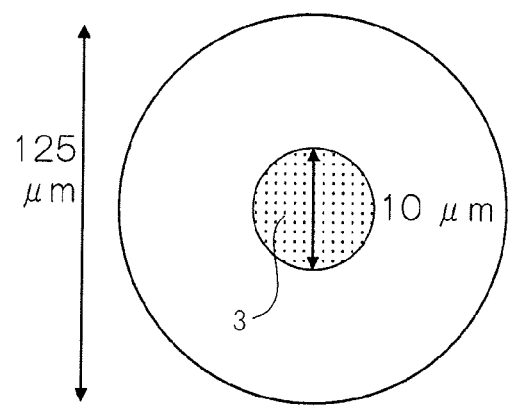
Fig.15(b)
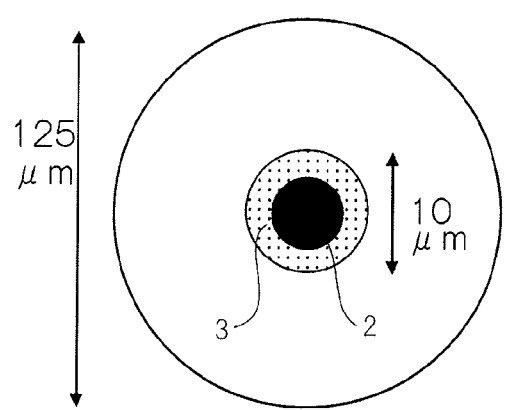
Fig.15(c)
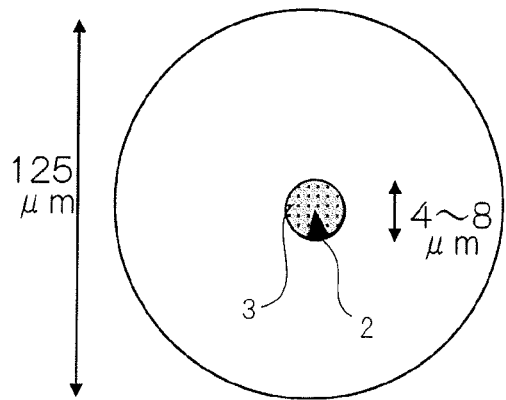

BURST MODE RARE EARTH-DOPED FIBER AMPLIFIER

TECHNICAL FIELD

The present invention relates to a burst mode rare earth doped fiber amplifier such as erbium doped fiber amplifier, a method for manufacturing the same and so on.

BACKGROUND ART

The principles of optical amplification in practical use are based on stimulated emission (or stimulated scattering, parametric amplification). In each case, a gain is obtained by the number of electrons in the upper energy state. The time constant decided by the elementary step of energy supply and the material constant and the structure constant is given to the process where the number of electrons in the upper state by optical amplification is reduced and is recovered with the energy supplied. An erbium doped fiber amplifier (hereafter referred to as "EDFA"), which is the most common optical amplifier, has a time constant of several ms and is therefore supposed to be suitable for the amplification of high speed signals of more than gigabit per second class (as a semiconductor optical amplifier with a short time constant etc. produce a pattern effect, a remedy is necessary for the amplification of high speed signals). However, when the modulation signal is not a series of bit string but a data format with a small granularity like a burst/packet, a transitional excursion occurs in a waveform or an envelope curve even if it is a comparatively long time constant of EDFA (E. Sshulze, M, Malach, F. Raub, "All-Raman amplified links in comparison to EDFA links in case of switched traffic," in ECOC 2002, Symposium 3.8).

On the other hand, many excursion suppression technologies are reported which are divided roughly into the optical methodology using an optical loop circuit etc. and the electric method using an automatic gain control circuit (AGC) etc. However, the optical methodology is of little practical use due to the complexity of configuration and the low controllability. (C-L. Zhao, H-Y. Tam, B-O. Guan, X. Dong, P. K. A. Wai, X. Dong, "Optical automatic gain control of EDFA using two oscillating lasers in a single feedback loop" Optics communications 225, 157-162 (2003)) On the other hand, the electric method has achieved certain results about the network which changes comparatively at a low speed. However, it has turned out that the electric control system only is not enough as the granularity of a data format becomes smaller and communication methods with a high circuit use efficiency ratio like an optical burst/optical packet have been studied.

According to the examination literature, the time constant of an electric circuit for suppressing a gain excursion is a sub-microsecond, and it cannot respond to the typical length (shortness) of the optical packet which accommodates high-speed payloads of more than 10 gigabits per second class (C. Tian a EDFA pumped by 1480- and 980-nm lasers, "Institute of Electrical and Electronics Engineers JLT 21(8)). 1728-1734 (2003), H. Nakaji, Y. Nakai, M. Shigematsu and M. Nishimura, "Superior high-speed automatic gain controlled erbium-doped fiber amplifiers, "Optical Fiber Technology 9, 25-35 (2003)). Furthermore, an optical controlling method is also proposed. However, as it has various problems, for example, its suppression is imperfect, its method is complication, etc., it has not been put into practical use.

Furthermore, a front formula during the process in which a burst transition of the input signal under WDM environment causes the transient response of EDFA is given approximately (refer to Non-Patent Document 1 below). However, although many methods of adaptively controlling the operating state of EDFA using several external circuits as mentioned above are proposed as a concrete measure to such a transient response, the concrete method of suppressing the transient response of EDFA itself is not provided at all.

FIG. 1 is a figure showing a transition example of a packet waveform brought about by EDFA. FIG. 1 shows an example of a packet which is 9.95328 bits having a 128 bits preamble and a 3814 bits payload, and whose duration is about 400 n second. As shown in FIG. 1, the waveform of an optical packet will collapse by gain excursion of EDFA.

Furthermore, when there is little traffic and if the intensity of all the pulses has been constant, its average power will become smaller. Therefore, the decrease in traffic can be grasped. However, the network control side does not always recognize the labels of each packet (for example, the optical amplification in a transmission channel: 1R relay etc.). The way generally used at the time is the monitoring of an average power. However, only by monitoring an average power, it is impossible to judge whether there is little traffic or the pulse intensity is low when a low average power is detected. In the conventional optical communication system, the EDFA controlled by average power monitor has been operated by APC (power fixed control). Although traffic is heavy and pulse intensity has the same average power as a low signal to such EDFA, if an optical signal with little traffic enters, there arise problems such as a nonlinear phenomenon and a damage of an optical element with very high peak power. On the other hand, if the gain of EDFA is changed, other characteristics (for example, gain flatness) etc. will be influenced. Furthermore, as an optical packet is supposed to go through various paths, the accumulation of the optical loss and optical gain which each packet experience will differ, and the pulse intensity will also differ.

The assumed measures in such a case fall roughly into two methods. One method is to adaptively control the pump optical intensity of EDFA to change the gain. However, this method includes a lot of problems, for example, the response speed is slow as a comparatively large amount of electric current is used, noise figure deteriorates, etc. The other possible method is to drive EDFA by ACC (electric-current fixed control), for example, and at the same time control the incident average power so as to keep the intensity of the optical pulse included therein constant. This method controls the intensity of the optical pulse. Generally, the pulse intensity is decreased. One of the concrete methods is implemented by an optical modulator. As there are many types of optical modulators, the optical pulse can be controlled at high speed by using an optical modulator. In that case, when the incident average power changes greatly (specifically, more than 10 dB), the operating conditions of EDFA will be changed greatly which are optimized to the incident power and gain on a specification with regard to the leaf length or the pump optical intensity. Specifically, the gain flatness of WDM will be lost. When the gain flatness of WDM is lost, WDM has a defect, and the transitional gain excursion changes for every wavelength band. Therefore, a rare earth doped fiber which can equally amplify the intensity of each wavelength channel especially even if there is little traffic etc., and an optical communication system using such a rare earth doped fiber are desired.

Non-Patent Document 1

Sun, Y., Zyskind, J. L., Srivastava, A. K., Zhang, L, "Analytical formula for the transient response of erbium-doped fiber amplifiers" Applied Optics, Vol. 38, Issue 9 (1999) pp 1682-1685

DISCLOSURE OF THE INVENTION

Problems to be Solved by the Invention

It is an object of the present invention to provide a rare earth doped fiber such as an erbium doped fiber amplifier whose transient response is suppressed.

It is an object of the present invention to provide an optical information communication system comprising a rare earth doped fiber such as an erbium doped fiber amplifier whose transient response is suppressed.

It is an object of the present invention to provide a rare earth doped fiber which can equally amplify the intensities of each wavelength channel, particularly, even if there is less traffic, and an optical information communication system comprising such a rare earth doped fiber.

It is an object of the present invention to provide a program for the construction of an optical information communication system comprising a rare earth doped fiber such as an erbium doped fiber amplifier whose transient response is suppressed.

Means for Solving Problems

The present invention is based on a knowledge that the use of a rare earth doped fiber with expanded active region can provide EDFA whose transient response is suppressed, which can favorably be used in optical information communication.

The present invention is also based on a knowledge that the installation of a gain equalizing filter in from of EDFA can make an optical power at a gain medium end and a wavelength dependence of a gain excursion small, thereby suppressing transient response.

The present invention is also based on a knowledge that the installation of a preamplifier can suppress the excess noise caused by a gain equalizing filter. The present information is furthermore based on a knowledge that overpumping can reduce the input power dependence of a rare earth doped fiber and obtain a fixed gain, thereby maintaining gain flatness (uniformity of gain to wavelength).

The first aspect of the present invention relates to an optical amplifier for optical packet communication comprising a rare earth doped fiber whose diameter of an active region is between 3.4 µm and 10 µm, inclusive. That is, a fiber amplifier for optical communication with low power output has been conventionally used in an optical amplifier for optical packet communication. This is because a fiber amplifier for high power output is expensive and it requires a larger space and it is not easy to handle. Furthermore, a fiber amplifier for optical communication has been considered not to be suitable as an amplifier for optical information communication using an optical pulse because the gain excursion (transition of gain to time) is large. However, the present invention can suppress the gain excursion by purposely using such a fiber amplifier for high power output used in optical communication in optical packet communication. The diameter of an active region may be 3.5 µm and 10 µm, inclusive, 4 µm and 6 µm, inclusive, or 4 µm and 5 µm, inclusive (the same shall apply hereinafter).

In a preferred embodiment of the first aspect of the present invention, a rare earth doped fiber is an optical fiber doped with erbium as a rare earth as described above.

A preferred embodiment of the first aspect of the present invention relates to an amplifier whose non-saturation region in the amplifier operation is expanded by reducing a numerical aperture so that the integration value of the overlapping region of erbium ions and the optical mode place might be small. Specifically, a preferred embodiment of the first aspect of the present invention relates to any one of the above-described amplifiers where the numerical aperture of the erbium doped fiber is less than or equal to 0.2. Preferably, the numerical aperture is less than or equal to 0.13. A numerical aperture can be controlled by adjusting the erbium concentration contained in a core and a clad, for example. Generally, an optical fiber with a high numerical aperture has been considered to be more efficient as stated in the column titled 1.7.2 Fiber structural dependence of "Erbium-doped Optical Fiber Amplifiers", edited by Shoichi Sudo, The Optonics Co., Ltd., pp 150-152. And it has been common knowledge to design an erbium doped fiber so that a numerical aperture might be as high as possible. The present invention uses a fiber with a low numerical aperture sot as to suppress a gain excursion. Reducing a numerical aperture enables the integration value of the overlapping region of erbium ions and the optical mode place to be small, thereby expanding the non-saturation region in the amplifier operation.

In a preferred embodiment of the first aspect of the present invention, the erbium doped fiber relates to any one the amplifier as described above, wherein comprises a core and clad surrounding the core, the core being doped with erbium as a rare earth, the clad being doped with a lower concentration of erbium than that included in the core. This kind of optical fiber is one embodiment where a numerical aperture is reduced.

A preferred embodiment of the first aspect of the present invention relates to the optical packet communication system using the amplifier as described above. As the system has the fiber amplifier as described above, it can amplify the signals comprising optical packets such as a header or a payload while suppressing a gain excursion.

The second aspect of the present invention relates to a method for amplifying an intensity of an optical packet signal using an amplifier for optical packet communication which comprises a rare earth doped fiber having an active region the diameter of which ranges between 3.4 µm and 10 µm. The fibers as explained earlier can appropriately be utilized as a rare earth doped fiber used in the optical amplification method according to this aspect. Particularly, an erbium doped fiber with a low numerical aperture can preferably be used.

A preferred embodiment of the second aspect of the present invention relates to an optical amplifying apparatus for optical packet communication comprising a gain equalizing filter, and a rare earth doped fiber having an active region the diameter of which ranges between 3.4 µm and 10 µm, into which a light having transmitted through the gain equalizing filter enters.

A preferred embodiment of the second aspect of the present invention relates to an optical amplifying apparatus for optical packet communication comprising a preamplifier, a gain equalizing filter into which a light amplified by the preamplifier enters, and a rare earth doped fiber having an active region the diameter of which ranges between 3.4 µm and 10 µm, into which a light having transmitted through the gain equalizing filter enters.

The third aspect of the present invention relates to a method for amplifying an optical packet comprising the steps of adjusting the intensities of wavelength channels so as to equalize the light intensities of the wavelength channels having entered a rare earth doped fiber and transmitted therethrough by a gain equalizing filter, and inputting the optical packet having gone through the above step to the rare earth doped fiber.

The fourth aspect of the present invention is an optical amplifying apparatus for optical packet communication comprising a first rare doped fiber having an active region the diameter of which ranges between 3.4 μm and 10 μm, an intermediate gain equalizing filter into which a light having transmitted through the first rare earth doped fiber enters, and a second rare earth doped fiber having an active region the diameter of which ranges between 3.4 μm and 10 μm, into which a light having transmitted through the intermediate gain equalizing filter enters, the first rare earth doped fiber being shorter in length than the second rare earth doped fiber, and the intermediate gain equalizing filter adjusting the intensities of wavelength channels so as to equalize the light intensities of the wavelength channels having transmitted through the second rare earth doped fiber. The fibers as explained earlier can appropriately be utilized as a rare earth doped fiber used in the optical amplification method according to this aspect. Particularly, an erbium doped fiber with a low numerical aperture can preferably be used.

In this way, including two prepared rare earth doped biers and a gain equalizing filter makes a gain excursion smaller, and flatness is not impaired (for example, the intensity difference at each channel is within 1 dBm), the width of an input signal is increased and the noise characteristic is also improved. As a result, the above optical amplifying apparatus can give the amplification characteristic to an input signal, which is same even when there is little traffic as when there is much traffic.

The two rare earth doped fibers are designed taking the wavelength range of an input signal, the magnitude of a gain, the intensity of an input signal, the intensity of an output signal, etc., into consideration comprehensively. Specifically, when a rare earth doped fiber having an active region of a certain size is used, the length is appropriately adjusted. The main role of the first rare earth doped fiber (31) is, for example, to give a small gain to the light incident on the intermediate gain equalizing filter (22) so that an excess noise may not occur by the loss with the intermediate gain equalizing filter (22). On the other hand, the main role of the second rare earth doped fiber is to amplify an optical signal. Therefore, the gain with the second rare earth doped fiber is preferably is larger than the gain with the first rare earth doped fiber. As the same or similar rare earth doped fibers are usually used, the length of the first rare earth doped fiber is preferably less than half of the length of the second rare earth doped fiber.

With regard to the specific length of the two rare earth doped fibers, preferably, the length of the first rare earth doped fiber is between 25 cm and 75 cm, inclusive, and the length of the second rare earth doped fiber is between 1 m and 3 m, inclusive. The rare earth doped fibers can preferably be used in the normal optical packet communication etc. within the range, as the rare earth doped fibers were actually designed and checked as to their functions.

The intermediate gain equalizing filter adjusts the intensities of each wavelength channel so that the optical intensities of each wavelength channel having transmitted through the second rare earth doped fiber may be equal. In order to make the intermediate gain equalizing filter function as mentioned above, it may have the characteristic that compensates the gain excursion with the two rare earth doped fibers. This guarantees the outputted gain flatness of an optical pulse. It is a well-known technology to control the characteristic of a gain equalizing optical filter. Therefore, if the gain excursion which matches the gain characteristics with the two rare earth doped fibers can be obtained, a gain equalizing filter may be designed and manufactured so as to compensate the gain excursion.

As shown in the embodiment described below, the use of an overpumping light source as a light source of a light entering into the first rare earth doped fiber can provide an optical amplifying apparatus for optical packet communication having an extremely good characteristic.

A specific output power of the overpumping light source (34) is between 200 mW and 1 W, inclusive.

The fifth aspect of the present invention relates to a method for manufacturing an erbium doped fiber amplifier comprising the step of designing the erbium doped fiber so as to have an active region the diameter of which ranges between 3.4 μm and 10 μm and to have a numerical aperture of less than 0.2 to make $\Gamma_j$ smaller, where $\Gamma_j$ is a factor indicating an integration value of an overlap area between erbium ions and an optical modal field in a wavelength channel.

The sixth aspect of the present invention relates to a program for obtaining an initial value and time fluctuation of a gain fluctuation for a rare earth doped fiber by making a computer operate as a means for inputting a cross-sectional area S of an active region of the rare earth doped fiber, a means for reading out a first factor and multiplying the cross-sectional area S of the active region by the first factor to obtain an intrinsic saturation power $P^{IS}(\lambda_j)$ for each wavelength channel, a means for reading out a light intensity $P^{OUT}(\lambda_j)$ after having transmitted through each wavelength channel and obtaining a value by dividing the read out $P^{OUT}(\lambda_j)$ by the previously obtained intrinsic saturation powder $P^{IS}(\lambda_j)$ for all wavelength channels to add the obtained values $P^{OUT}(\lambda_j)/P^{IS}(\lambda_j)$, and a means for reading out a predetermined number and a second factor and adding a value obtained by adding the values $P^{OUT}(\lambda_j)/P^{IS}(\lambda_j)$ for all wavelength channels and the predetermined number to multiply the value after the addition by the second factor.

The sixth aspect of the present invention relates to a computer program for designing an optical communication system, which at least makes a computer operate as a means for displaying an icon related to a rare earth doped fiber on an output device, a means for displaying the icon at a predetermined position on a design screen for obtaining an operation of the optical communication system, and a means for, when the icon is displayed at the predetermined position, outputting, for an optical pulse inputted to the rare earth doped fiber, an amplitude of the inputted optical pulse amplified by multiplying an amplification factor stored in advance.

A preferred embodiment of the sixth aspect of the present invention relates to the program as described above for designing an optical communication system in consideration of an initial value and time fluctuation of a gain fluctuation for a rare doped fiber by making a computer operate as a means for inputting a cross-sectional area S of an active region of the rare earth doped fiber, a means for reading out a first factor and multiplying the cross-sectional area S of the active region by the first factor to obtain an intrinsic saturation power $P^{IS}(\lambda_j)$ for each wavelength channel, a means for reading out a light intensity $P^{OUT}(\lambda_j)$ after having transmitted through each wavelength channel and obtaining a value by dividing the read out $P^{OUT}(\lambda_j)$ by the previously obtained intrinsic saturation powder $P^{IS}(\lambda_j)$ for all wavelength channels to add the obtained values $P^{OUT}(\lambda_j)/P^{IS}(\lambda_j)$, and a means for reading out a predetermined number and a second factor and adding a value obtained by adding the values $P^{OUT}(\lambda_j)/P^{IS}(\lambda_j)$ for all wavelength channels and the predetermined number to multiply the value after the addition by the second factor.

A preferred embodiment of the sixth aspect of the present invention relates to a computer program for designing an optical communication system, which at least makes a computer operate as a means for displaying on an output device an icon related to an optical amplifying apparatus for optical packet communication where a prefilter and a rare earth doped fiber are combined, a means for displaying the icon at a predetermined position on a design screen for obtaining an operation of the optical communication system; and a means for, when the icon is displayed at the predetermined position, outputting, for an optical pulse inputted to the optical amplifying apparatus for optical packet communication, an amplitude of the inputted optical pulse amplified by multiplying an amplification factor stored in advance.

A preferred embodiment of the sixth aspect of the present invention relates to a computer-readable information storage media whereon any one of the programs as described above is stored A preferred embodiment of the sixth aspect of the present invention relates to a computer whereon any one of the programs as described above is mounted, for designing an optical communication system comprising a rare earth doped fiber Effect of the Invention According to the present invention, a rare earth doped fiber such as an erbium doped fiber amplifier whose transient response is suppressed can be provided.

According to the present invention, an optical information communication system comprising a rare earth doped fiber such as an erbium doped fiber amplifier whose transient response is suppressed can be provided.

According to the present invention, a rare earth doped fiber can be provided which can equally amplify the intensities of each wavelength channel, particularly, even if there is less traffic, and an optical information communication system comprising such a rare earth doped fiber.

According to the present invention, a program can be provided for the construction of an optical information communication system comprising a rare earth doped fiber such as an erbium doped fiber amplifier whose transient response is suppressed.

BRIEF DESCRIPTION OF THE DRAWINGS

FIG. 5 (a) shows Pattern I, Type B, FIG. 5 (b) shows Pattern II. Type A, FIG. 5 (c) shows Pattern III, Type A, and FIG. 5 (d) shows Pattern IV, Type A.

FIG. 6 (a) shows Pattern I, FIG. 6 (b) shows Pattern II, FIG. 6 (c) shows Pattern III, and FIG. 6 (d) shows Pattern IV.

FIG. 12 shows a graph replaced with a drawing showing the characteristic of a rare earth doped fiber with enhanced active region. FIG. 12 (a) shows the intensity of the signal of each channel, and FIG. 12 (b) shows the form of a rectangular pulse.

FIG. 13 shows a graph replaced with a drawing showing a system comprising an overpumping light source, two rare earth doped fibers with enhanced active region, and a intermediate gain equalizing filter. FIG. 13 (a) shows the intensity of the signal of each channel, and FIG. 13 (b) shows the form of a rectangular pulse.

FIG. 15 is a figure showing a cross section of a specific rare earth doped fiber. FIG. 15 (a) shows an example of a cross section of a single mode fiber, FIG. 15 (b) shows an example of a fiber where an active region and a core are arranged concentrically, and FIG. 15 (c) shows an example of a fiber where an active region is almost equal to a core.

DESCRIPTION OF THE NUMERALS

Figure 1:
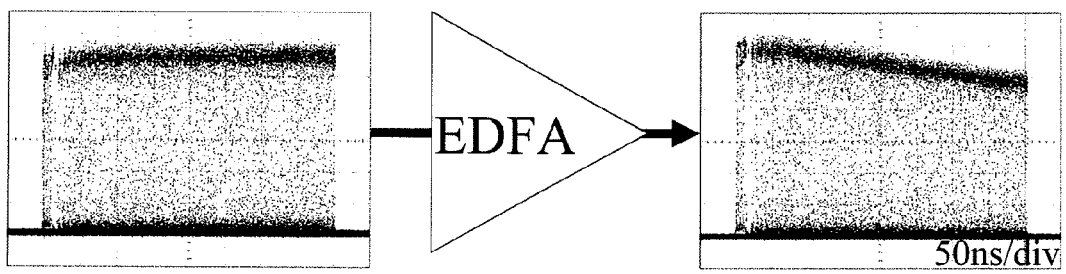
FIG. 1 is a diagram showing an example of transition of a packet waveform brought about by EDFA.

1 Fiber
2 Active area
3 Core
4 Clad
10 Channel such as optical fiber
11 Optical packet
12 Gain equalizing filter
13 Optical packet
14 Fiber amplifier
15 Optical pulse
21 Icon menu
22 Icon related to fiber amplifier
23 Icon related to gain equalizing filter
24 Design screen
31 First rare earth doped fiber
32 Intermediate gain equalizing filter
33 Second rare earth doped fiber
34 Overpumping light source

BEST MODE FOR CARRYING OUT THE INVENTION

Hereinafter, best mode for carrying out the present invention is explained. The first aspect of the present invention relates to an optical amplifier for optical packet communication comprising a rare earth doped fiber whose diameter of an active region is between 3.4 µm and 10 µm, inclusive. That is, a fiber amplifier for optical communication with small power output has been conventionally used as an optical amplifier for optical packet communication. This is because a fiber amplifier for high power output is expensive and it requires a larger space and it is not easy to handle. Furthermore, a fiber amplifier for high power output has been considered not to be suitable as an amplifier for optical information communication using an optical pulse because the gain excursion is large. However, the present invention can suppress the gain excursion by using purposely such a fiber amplifier used in optical communication for high power output in optical packet communication.

Figure 14:
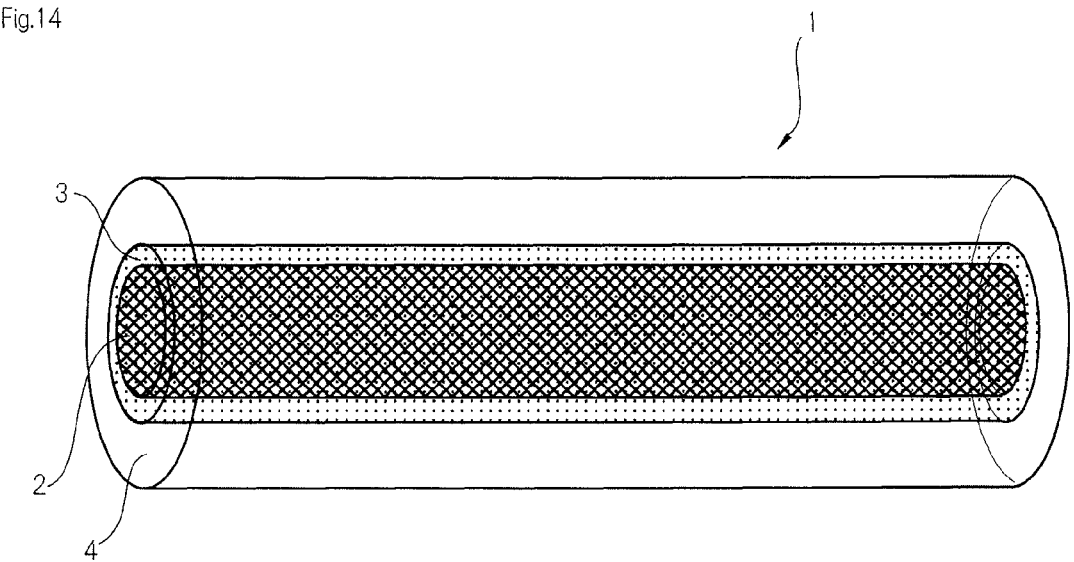
FIG. 14 is a diagram for explaining the schematic configuration of the optical amplifier for optical packet in the present invention.

FIG. 14 is a diagram for explaining the schematic configuration of an optical amplifier for optical packet communication in the present invention. As shown in FIG. 14, an optical amplifier for optical packet communication comprises a rare earth doped fiber (1). And the rare earth doped fiber (1) is generally configured so as to comprise a core (3) and a clad (4). On the other hand, usually, a whole core (2) is an active region (2), while in some cases a part of a core (3) is an active region (2) as shown in FIG. 14.

FIG. 15 is a figure showing the cross section of a specific rare earth doped fiber. FIG. 15 (a) shows an example of a cross section of a single mode fiber, FIG. 15 (b) shows an example of a fiber where an active region and a core are arranged concentrically, and FIG. 15 (c) shows an example of a fiber where an active region is almost equal to a core. In many rare earth doped fibers, a core is almost the same size as an active region as shown in FIG. 15 (c). On the other hand, a core may not be the same as an active region.

An active region means a gain area, or also called an active erbium area when a rare earth to de doped is erbium, which is a certain region within a core of a fiber. A core is a region having a higher rate of specific refraction than its circumference for the waveguide. In the place where a pump optical intensity is weak, the sorption of signal light is larger than its amplification. For this reason, an active region is usually arranged so that it may overlap with the region where the pump light intensity near the center of a core is strong. An active region is a region where rare earth ions are doped, which is uniquely determined at the time of designing a fiber and which at a later time can be checked with luminescence of the spontaneous emission light by pump light irradiation.

A preferred embodiment of the first aspect of the present invention is an amplifier as described above where the rare earth is erbium. That is, an optical fiber where an erbium doped fiber amplifier can be used as a rare earth doped fiber, and an erbium doped fiber amplifier is preferable as demonstrated in the embodiment.

The desirable mode of the 1st side of the present invention relates to an amplifier where the numerical aperture of the erbium doped fiber is less than or equal to 0.2. Preferably, the numerical aperture is less than or equal to 0.13. A numerical aperture can be controlled by adjusting the erbium concentration contained in a core and a clad, for example. Generally, an optical fiber with a high numerical aperture has been considered to be more efficient as stated in the column titled 1.7.2 Fiber structural dependence of "Erbium-doped Optical Fiber Amplifiers", edited by Shoichi Sudo, The Optonics Co., Ltd., pp 150-152. And it has been common knowledge to design an erbium doped fiber so that a numerical aperture might be as high as possible. The present invention uses a fiber with a low numerical aperture sot as to suppress a gain excursion. Reducing a numerical aperture enables the integration value of the overlapping region of erbium ions and the optical mode place to be small, thereby expanding the non-saturation region in the amplifier operation.

In a preferred embodiment of the first aspect of the present invention, the erbium doped fiber relates to any one the amplifier as described above, wherein comprises a core and clad surrounding the core, the core being doped with erbium as a rare earth, the clad being doped with a lower concentration of erbium than that included in the core. This kind of optical fiber is one embodiment where a numerical aperture is reduced.

A preferred embodiment of the first aspect of the present invention relates to the optical packet communication system using the amplifier as described above. As the system has the fiber amplifier as described above, it can amplify the signals comprising optical packets such as a header or a payload while suppressing a gain excursion. A well-known configuration in an optical packet communication system can be appropriately used for this optical packet communications system. And, generally, the fiber amplifier of the present invention can be used as a fiber amplifier in an optical packet communication system. Specifically, an optical packet communication system comprises a transmitter and a receiver as well as a node for connecting them and an optical fiber for connecting them. And, because optical pulse intensity becomes weaker as communication distance becomes longer, a fiber amplifier is appropriately used so as to intensify the amplitude. The fiber amplifier of the present invention can appropriate be installed as a means for amplifying such amplitude.

The second aspect of the present invention relates to a method for amplifying an intensity of an optical packet signal using an amplifier for optical packet communication which comprises a rare earth doped fiber having an active region the diameter of which ranges between 3.4 µm and 10 µm. That is, as demonstrated in the embodiment described below, the fiber amplifier of the present invention preferably makes it possible to amplify an optical packet signal while suppressing a gain excursion. The fiber as explained earlier can appropriately be used as a rare earth doped fiber used in the optical amplification method according to this aspect. Particularly, an erbium doped fiber with a low numerical aperture can preferably be used.

A preferred embodiment of the second aspect of the present invention relates to an optical amplifying apparatus for optical packet communication comprising a gain equalizing filter, and a rare earth doped fiber having an active region the diameter of which ranges between 3.4 µm and 10 µm, into which a light having transmitted through the gain equalizing filter enters. That is, an optical packet usually comprises a number of optical pulses. The amplification characteristic of a fiber amplifier changes depending on the wavelengths of input light. And when an optical packet contains several optical pulses with different wavelengths, the intensity amplified by a fiber amplifier will differ for every wavelength. Therefore, if the optical packet comprising the optical pulse comprising several wavelengths is amplified with a fiber amplifier, the amplitude after amplification will not become uniform. Then, a gain equalizing filter is used.

Figure 7:
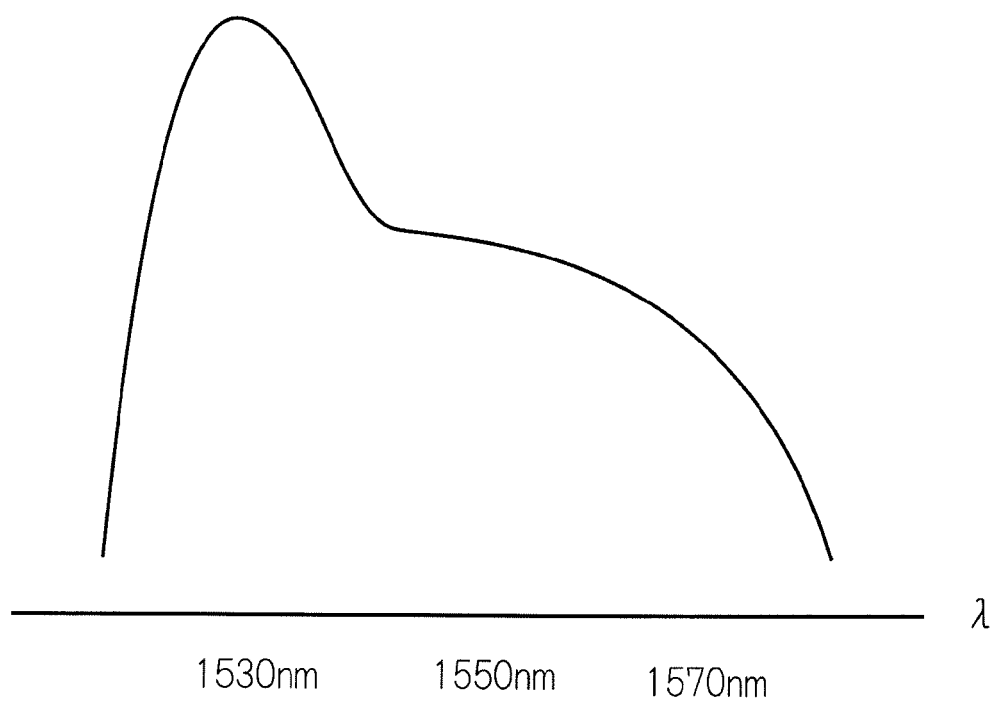
FIG. 7 is a conceptual diagram showing the increase characteristic of an erbium doped fiber amplifier.

FIG. 7 is a schematic diagram showing the increase characteristic of an erbium doped fiber amplifier. As shown in FIG. 7, an erbium doped fiber amplifier has a maximum amplitude around near 1530 nm and has a maximum gain excursion around that. On the other hand, near 1580 nm, the amplification of amplitude is not so large. On the other hand, if the optical signal of wavelength near 1530 nm is amplified, a noise will increase. For this reason, in the present invention, it is desirable to use the light whose wavelength ranges between 1535 nm and 1570 nm, inclusive, as an incoming signal, more preferably between 1535 nm and 1565 nm, inclusive.

In the usual optical packet communication system, first of all, the amplitude of an optical packet is amplified by an erbium doped fiber amplifier. Then, the degrees of amplification differ depending on the wavelength of the optical pulse contained in an optical packet. Therefore, the gains of the amplified optical pulses having different gains depending on the wavelengths are equalized using a gain equalizing filter. When all the channels contained in an optical packet are used, there are few problems in the equalizing method. However, especially when only a part of channels is used, a large gain excursion will occur as shown in the formula (1) etc. as described below. Therefore, in a preferred embodiment of the present invention, the amplitude of an optical packet is amplified by a fiber amplifier after having transmitted through a gain equalizing filter in advance. By doing in this way, especially even if only some channels are used, gain excursion can be suppressed. That is, in the present invention, the wavelength band dependence of transitional gain excursion can be reduced by using a gain equalizing filter.

A preferred embodiment of the second aspect of the present invention relates to an optical amplifying apparatus for optical packet communication comprising a preamplifier, a gain equalizing filter into which a light amplified by the preamplifier enters, and a rare earth doped fiber having an active region the diameter of which between 3.4 μm and 10 μm, into which a light having transmitted through the gain equalizing filter enters. A well-known preamplifier used in an optical communication can appropriately be used as a preamplifier. By using a preamplifier, the excess noise caused by a gain equalizing optical filter can be suppressed in the present invention.

The third aspect of the present invention relates to a method for amplifying an optical packet comprising the steps of adjusting the intensities of wavelength channels so as to equalize the light intensities of the wavelength channels having entered a rare earth doped fiber and having transmitted therethrough by a gain equalizing filter, and inputting the optical packet having gone through the above step to the rare earth doped fiber.

Figure 8:
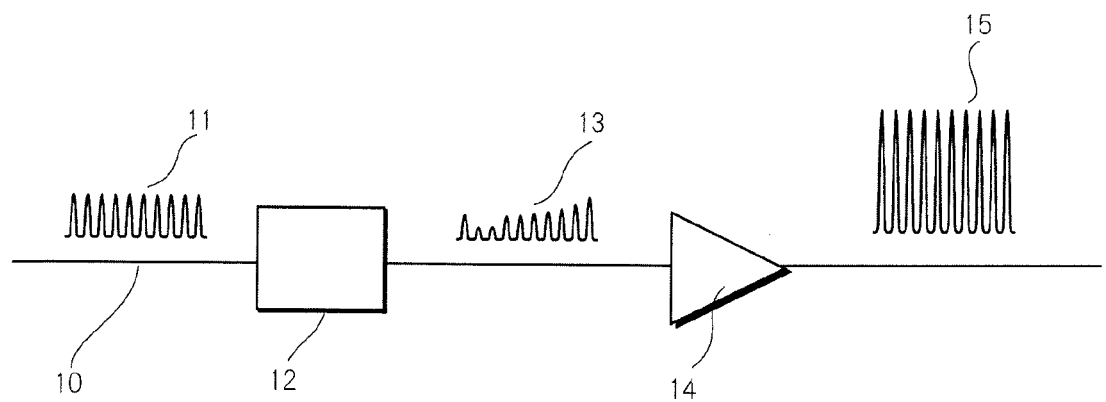
FIG. 8 is a conceptual diagram for explaining the amplifying method of an optical packet according to the third aspect of the present invention.

FIG. 8 is a schematic diagram for explaining the amplification method of an optical packet according to the third aspect of the present invention. As shown in FIG. 8, an optical packet (11) is transmitted through a transmission channel (10) such as an optical fiber. The optical packet comprises several wavelengths of an optical pulse. And the optical packet (11) comprising several wavelengths of an optical pulse is input into a gain equalizing filter (12). However, though a general gain equalizing filter is set to equalize the gain of each pulse having transmitted therethrough, the gain equalizing filter (12) in the present invention is set to equalize the optical intensity of the wavelength channels input on the rare earth doped fiber and having transmitted therethrough. For this reason, the gain of the optical pulse of each wavelength contained in the optical packet (13) having transmitted through the gain equalizing filter does not become uniform. On the other hand, the gain equalizing filter is set so that after the optical packet (13) having transmitted through the gain equalizing filter goes through the fiber amplifier (14), the gain of the optical pulse (15) having transmitted through the fiber amplifier bay be uniform (for example, the gap of the light intensity of each channel is within plus or minus 10% up and down of average intensity, preferably within plus or minus 5% up and down of average intensity, more preferably within plus or minus 3% up and down of average intensity).

By using the above gain equalizing filter, the gain of the optical pulse (15) having transmitted through the fiber amplifier (14) will become uniform. Therefore, the above fiber amplifier can preferably be used in optical packet communication. On the other hand, there is a problem that when there is little traffic a packet is affected by the gain excursion and thus the inclination of the packet is emphasized. Furthermore, when there is little traffic, the phenomenon occurs where the peak value of a packet becomes unusually high. Such an unusually high peak value causes further gain excursion and also has a much possibility of giving damage to an optical element. Therefore, it is necessary to detect that using a certain measure and restrict the incidence power to a fiber amplifier. However, as a result, the conditions of the incidence light whose average power is extremely low will occur. Therefore, even if the amount of traffic is changed, a fiber amplifier whose optical intensity of each channel is not changed is desired.

Figure 10:
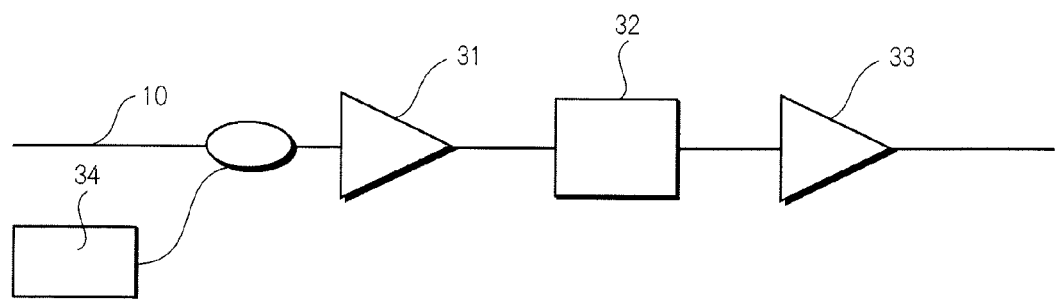
FIG. 10 is a block diagram showing the schematic configuration of an optical amplifier for optical packet communication according to an aspect of the present invention.

The above-mentioned problem is solved by the apparatus comprising two rare earth doped fibers and the gain equalizing optical filter arranged between them. FIG. 10 is a block diagram showing a schematic configuration of a light amplifier for optical packet communication according to one aspect of the present invention. That is, as shown in FIG. 10, The fourth aspect of the present invention is an optical amplifying apparatus for optical packet communication comprising a first rare earth doped fiber having an active region the diameter of which ranges between 3.4 μm and 10 μm, an intermediate gain equalizing filter into which a light having transmitted through the first rare earth doped fiber enters, and a second rare earth doped fiber having an active region the diameter of which ranges between 3.4 μm and 10 μm, into which a light having transmitted through the intermediate gain equalizing filter enters, the first rare earth doped fiber being shorter in length than the second rare earth doped fiber, and the intermediate gain equalizing filter adjusting the intensities of wavelength channels so as to equalize the light intensities of the wavelength channels having transmitted through the second rare earth doped fiber.

In this way, including two prepared rare earth doped biers and a gain equalizing filter makes a gain excursion smaller, and flatness is not impaired (for example, the intensity difference at each channel is within 1 dBm). As a result, the above optical amplifying apparatus can give the amplification characteristic to an input signal, which is same even when there is little traffic as when there is much traffic.

The two rare earth doped fibers are designed taking the wavelength range of an input signal, the magnitude of a gain, the intensity of an input signal, the intensity of an output signal, etc., into consideration comprehensively. Specifically, when a rare earth doped fiber having an active region of a certain size is used, the length is appropriately adjusted. The main role of the first rare earth doped fiber (31) is, for example, to give a small gain to the light incident on the intermediate gain equalizing filter (22) so that an excess noise may not occur by the loss with the intermediate gain equalizing filter (22). On the other hand, the main role of the second rare earth doped fiber is to amplify an optical signal. Therefore, the gain with the second rare earth doped fiber is preferably is larger than the gain with the first rare earth doped fiber. As the same or similar rare earth doped fibers are usually used, the length of the first rare earth doped fiber is preferably less than half of the length of the second rare earth doped fiber.

With regard to the specific length of the two rare earth doped fibers, preferably, the length of the first rare earth doped fiber is between 25 cm and 75 cm, inclusive, and the length of the second rare earth doped fiber is between 1 m and 3 m, inclusive. The rare earth doped fibers can preferably be used in the normal optical packet communication etc. within the range, as the rare earth doped fibers were actually designed and checked as to their functions.

The intermediate gain equalizing filter adjusts the intensities of each wavelength channel so that the optical intensities of each wavelength channel having transmitted through the second rare earth doped fiber may be equal. The term "intermediate" in the intermediate gain equalizing filter means that the filter is located in the intermediate of the second rare earth doped fiber. Therefore, a well-known gain equalizing filter can appropriately be used as the intermediate gain equalizing filter. In order to make the intermediate gain equalizing filter function as mentioned above, it may have the characteristic that compensates the gain excursion with the two rare earth doped fibers. This guarantees the outputted gain flatness of an optical pulse. It is a well-known technology to control the characteristic of a gain equalizing optical filter. Therefore, if the gain excursion which matches the gain characteristics with the two rare earth doped fibers can be obtained, a gain equalizing filter may be designed and manufactured so as to compensate the gain excursion.

As shown in the embodiment described below, the use of an overpumping light source as a light source of a light entering into the first rare earth doped fiber can provide an optical amplifying apparatus for optical packet communication having an extremely good characteristic. An overpumping light source means a light source with a power output exceeding a proper pump intensity, and usually a light source with a power output much more exceeding the assumed pump intensity. Explained more concretely, an overpumping light source is a light source much more exceeding the propger pump light intensity determined by an active region of EDF, a doping condition, a leaf length, and several conditions of assumed incidence signals, etc. in the design methods such as usual EDFA, and the optical electrical power of the large portion does not contribute to an optical amplification directly. As for an overpumping in rare earth doped fiber such as EDFA, refer to M. Karasek et al. "Suppression of Dynamic Cross Saturation in Cascades of Overpumped Refer to Erbium-Doped Fiber Amplifiers" Institute of Electrical and Electronics Engineers Photonic Technology letters, Vol. 10, No. 7, July, 1998. By using an overpumping light source, in the present invention, the incidence power dependence of an amplifier can be reduced near to a fixed gain. As a result, the gain flatness of an output pulse can be maintained.

A specific output power of the overpumping light source (34) is between 200 mW and 1 W, inclusive. Although it is preferable that the output power of an overpumping light source is higher, because the cost of an apparatus may be higher, the preferable output power is between 300 mW and 600 mW, inclusive, for example, 550 mW.

The pulse signal from an overpumping light source enters into a first rare earth doped fiber through a coupler. Then, with regard to the first rare earth doped fiber (31), a gain is given to an optical signal so that excess noise may not occur by the loss with a intermediate gain equalizing filter (32). The intermediate gain equalizing filter (32) adjusts the intensity of each wavelength channel so that the light intensity of each wavelength channel having transmitted through the second rare earth doped fiber may be equal. More specifically, as the intermediate gain equalizing filter is designed and manufactured so that it may have the characteristic compensating the gain excursion which matches the gain characteristics with the two rare earth doped fibers, the light signal which compensated these gain characteristics will be output. The light signal having transmitted through the intermediate gain equalizing filter (32) enters into the second rare earth doped fiber. The optical intensity of each wavelength channel having transmitted through the second rare earth doped fiber is set to be almost equal.

The sixth aspect of the present invention relates to a program for obtaining an initial value and time fluctuation of a gain fluctuation for a rare earth doped fiber by making a computer operate as a means for inputting a cross-sectional area S of an active region of the rare earth doped fiber, a means for reading out a first factor and multiplying the cross-sectional area S of the active region by the first factor to obtain an intrinsic saturation power $P^{IS}(\lambda_j)$ for each wavelength channel, a means for reading out a light intensity $P^{OUT}(\lambda_j)$ after having transmitted through each wavelength channel and obtaining a value by dividing the read out $P^{OUT}(\lambda_j)$ by the previously obtained intrinsic saturation powder $P^{IS}(\lambda_j)$ for all wavelength channels to add the obtained values $P^{OUT}(\lambda_j)/P^{IS}(\lambda_j)$, and a means for reading out a predetermined number and a second factor and adding a value obtained by adding the values $P^{OUT}(\lambda_j)/P^{IS}(\lambda_j)$ for all wavelength channels and the predetermined number to multiply the value after the addition by the second factor.

The sixth aspect of the present invention relates to a computer program for designing an optical communication system, which at least makes a computer operate as a means for displaying an icon related to a rare earth doped fiber on an output device, a means for displaying the icon at a predetermined position on a design screen for obtaining an operation of the optical communication system, and a means for, when the icon is displayed at the predetermined position, outputting, for an optical pulse inputted to the rare earth doped fiber, an amplitude of the inputted optical pulse amplified by multiplying an amplification factor stored in advance.

Figure 9:
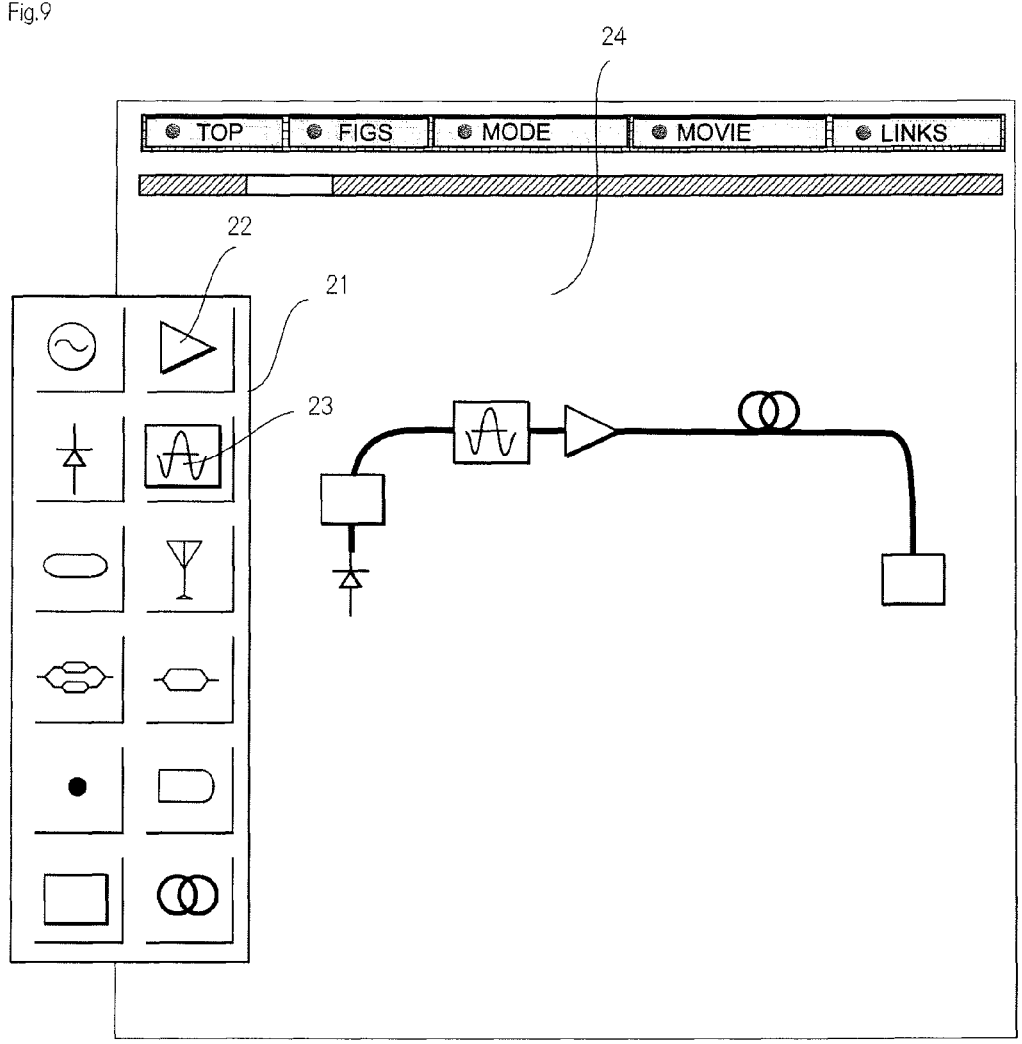
FIG. 9 is a conceptual diagram for explaining a program according to the sixth aspect of the present invention.

FIG. 9 is a conceptual diagram for explaining program according to the sixth aspect of the present invention. As shown in FIG. 9, the computer whereon this program is mounted displays a screen as shown in FIG. 9 on an output device such as monitor. That is, an icon menu (22) displays an icon (22) about a fiber amplifier, an icon (23) about a gain equalizing optical filter, etc. And when these icons are appropriately dragged and dropped on a design screen (24), the devices etc. relating to the icons dragged are depicted on the design screen. When an optical pulse is input into a fiber amplifier on this design screen, an amplification factor stored on the storage unit is read out, multiplied by the intensity of the input optical pulse, and then output. It is a desirable mode of the present invention to prepare a further icon about the fiber amplifier in the present invention in addition to the icon about the usual fiber amplifier.

A preferred embodiment of the sixth aspect of the present invention relates to the program as described above for designing an optical communication system in consideration of an initial value and time fluctuation of a gain fluctuation for a rare earth doped fiber by making a computer operate as a means for inputting a cross-sectional area S of an active region of the rare earth doped fiber, a means for reading out a first factor and multiplying the cross-sectional area S of the active region by the first factor to obtain an intrinsic saturation power $P^{IS}(\lambda_j)$ for each wavelength channel, a means for reading out a light intensity $P^{OUT}(\lambda_j)$ after having transmitted through each wavelength channel and obtaining a value by dividing the read out $P^{OUT}(\lambda_j)$ by the previously obtained intrinsic saturation powder $P^{IS}(\lambda_j)$ for all wavelength channels to add the obtained values $P^{OUT}(\lambda_j)/P^{IS}(\lambda_j)$, and a means for reading out a predetermined number and a second factor and adding a value obtained by adding the values $P^{OUT}(\lambda_j)/$ $P^{IS}(\lambda_j)$ for all wavelength channels and the predetermined number to multiply the value after the addition by the second factor.

A preferred embodiment of the sixth aspect of the present invention relates to a computer program for designing an optical communication system, which at least makes a computer operate as a means for displaying on an output device an icon related to an optical amplifying apparatus for optical packet communication where a prefilter and a rare earth doped fiber are combined, a means for displaying the icon at a predetermined position on a design screen for obtaining an operation of the optical communication system; and a means for, when the icon is displayed at the predetermined position, outputting, for an optical pulse inputted to the optical amplifying apparatus for optical packet communication, an amplitude of the inputted optical pulse amplified by multiplying an amplification factor stored in advance.

Specifically, when a gain equalizing optical filter and a fiber amplifier are located in a line in this order as shown in FIG. 9, for example, it is preferable to give an output characteristic and a gain excursion as explained herein.

The preferred embodiment of the sixth aspect of the present invention relates to a computer-readable information recording medium whereon any one the programs as described above.

The desirable embodiment of the sixth aspect of the present invention relates to a computer for designing an optical telecommunication system whereon any one of the programs as described above is mounted and which comprises a rare earth doped fiber. The computer of the present invention stores any one of the programs as described above onto main memory. And when there is an input from a pointing device etc., CPU reads the program stored on the main memory, appropriately reads the information stored on the memory based on the read instructions, performs predetermined operations, and outputs. In order to realize such operations, a control part is connected with an input unit, an output unit, a storage part and an operation part via a bus, etc. so that information can be transmitted and received.

In the present invention, a well-known rare earth doped fiber such as an erbium doped optical fiber, having a comparatively large diameter of an active region, can be used. As a rare earth in a rare earth doped fiber, praseodymium, thulium, or neodymium other than erbium, etc. can be used. However, as the representative example of an optical fiber amplifier is an erbium doped optical fiber, an erbium-doped optical fiber is explained as an example hereinafter. As 10% to 20% by weight of germanium as well as 500 to 2000 ppm of erbium as an amplification media as dopant for increasing a refractive index are added to the active region of an erbium doped optical fiber, it has excellent characteristics, for example, a high gain or a low noise, etc. Moreover, an amplification wavelength band is in 1.55 μm, and is widely used as an optical amplifier for 1.5 μm bandwidth.

An erbium doped optical fiber consists of an active region and a clad, and the active region is made of quartz glass containing erbium, aluminum, and germanium.

The content of germanium is less than 1.5% by weight, preferably 0.5% to 1.0% by weight.

Although the content of aluminum is not particularly limited, it is usually less than 4% by weight. Containing aluminum makes it possible to flatten the wavelength dependence of the gain in a 1540-1560 nm bandwidth and to improve the gain flatness. Furthermore, an aluminum ion is coordinated with an erbium ion and can suppress a formation of an erbium cluster. In this way, the energy exchange between erbium ions can be reduced, and the excellent energy conversion efficiency can be obtained. The content of erbium of an active region is not particularly limited, and can appropriately be determined depending on the purposes/applications.

A fiber amplifier such as an erbium doped optical fiber amplifier can be manufactured using well-known methods, for example, chemical-vapor vapor-depositing methods such as MCVD method or VAD method, or the immersing method using an aluminum compound solution, by manufacturing a mother agent for a fiber where elements such as germanium are added at a desired concentration and melting-drawing same.

It is to be understood that the technical scopes of the present invention is not limited to the above embodiments and various changes may be made without departing from the spirit of the present invention. An active region may contain other elements as long as it contains a desired concentration of erbium, aluminum, and germanium, as described above. Furthermore, by making an active region contain cerium, ytterbium, and lanthanum 0.5% to 2.0% by weight, respectively, for example, the bond between erbium ions can be suppressed further, and energy conversion efficiency can be improved further. Therefore, even if a high concentration of erbium is contained, excellent energy conversion efficiency can be obtained. Moreover, a crystalline structure is made stable and the optical loss derived from a structure deficiency can be reduced.

The gain excursion G'(0) of EDFA can be approximated by the following formula (I), where G(t) is the gain of EDFA (Sun, Y., Zyskind, J. L., Srivastava, A. K., Zhang, L., "Analytical formula for the transient response of erbium doped fiber amplifiers" Applied Optics Volume 38, Issue 9 (1999) pp 1682-1685).

[Formula 1]

$$G'(0) = \frac{[G(\infty) - G(0)]}{\tau_0}\left[1 + \sum_j \frac{P^{out}(\lambda_j)}{P^{IS}(\lambda_j)}\right] \quad (1)$$

$$P^{IS}(\lambda_j) = \frac{hvS}{[\sigma_a(\lambda_j) + \sigma_e(\lambda_j)]\Gamma_j\tau_0} \quad (2)$$

In the above formula (I), G(0) is the gain before the transient and G (∞) is the steady gain after the transient. $\tau_0$ means the intrinsic lifetime of the upper level of the erbium ions. $\tau_0$ can be obtained by turning on and off excitation light. Although three excitation levels may exist, two level systems of $Er^{3+}$ concerning the emission transient were assumed here. $P^{IS}(\lambda_j)$ means the intrinsic saturation power at the wavelength channels ($\lambda_j$). hv means the light intensity. S means the active erbium cross-sectional area of EDF. $\sigma_a$ and $\sigma_e$ mean the absorption and stimulated emission cross section, respectively, at the wavelength channels. $\sigma_a$ and $\sigma_e$ can be obtained by well-known spectroscopic analyses such as a transverse fluorescence lifetime measurement technique. $\Gamma_j$ means the confinement factor (overlap factor) which is the overlap integral between the erbium ions and the modal field of light at the wavelength channels. In this formula, signal light and pump light can be treated identically.

G'(0) indicates the initial slope of gain excursion. On the other hand, conventionally, an optical fiber with a large diameter of an active region has been used so as to obtain a high power output. That is, since an optical fiber with a large diameter of an active region is used when $P^{OUT}$ is large, usually, the use of such an optical fiber will inevitably increase $P^{OUT}$ as well as a gain excursion. In the present invention, such an optical fiber with a large diameter of an active region usually used for a high power output is used for a light pulse with a low power output (for example, a power output of between 1 mW and 1 W, inclusive, preferably between 10 mW and 500 mW, inclusive, more preferably between 50 mW and 400 mW, inclusive).

As shown in the above formula, G'(0) indicates the slope of a gain excursion, and is inversely proportional to S. Therefore, the gain variation can be improved by using EDF with a larger erbium cross-sectional area. Furthermore, the erbium doped fiber amplifier of the present invention, combined with the electric controlling method conventional in the art, can also constitute a gain excursion suppression light amplifier with a larger time response.

As mentioned above, $P^{IS}(\lambda_j)$ may be increased so as to reduce G'(0). For the purpose, S may be increased or $\Gamma_j$ may be decreased. Furthermore, a burst mode erbium doped fiber amplifier may be designed so as to expand a non-saturation region and to decrease a numerical aperture. In the preferred embodiment of the present invention, the numerical aperture of an erbium doped fiber is less than or equal to 0.2, more preferably, less than or equal to 0.13. A numerical aperture can be controlled by adjusting the erbium concentration contained in a core and a clad. For example, an optical fiber where a core is doped with erbium as a rare earth and a clad is also doped with erbium. That is, in the present invention, it is desirable to use an optical fiber having a clad doped with erbium with a lower concentration than the erbium concentration in a core. Alternatively, an optical fiber where a core is not doped with a rare earth such as erbium and only a clad is doped with erbium. The fifth aspect of the present invention relates to a method for manufacturing an erbium doped fiber amplifier comprising the step of designing the erbium doped fiber so as to have an active region whose diameter is between 3.4 µm and 10 µm, inclusive, and to have a numerical aperture of less than or equal to 0.2 to make $\Gamma_j$, small, where $\Gamma_j$ is a coefficient indicating an integration value of an overlap area between erbium ions and an optical modal field at a wavelength channel.

Embodiment 1

Figure 2:
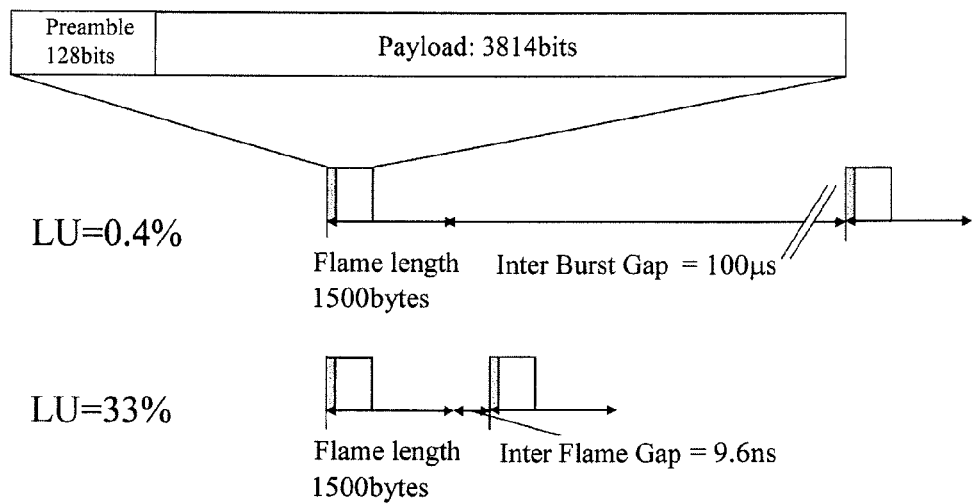
FIG. 2 is a conceptual diagram showing the packet format and the traffic intensity in the embodiment.

In the following embodiment, a WDM packet segmented into eight wavelengths from 10G-Ethernet frame input was transmitted. FIG. 2 is a conceptual diagram showing the packet format and traffic intensity in this embodiment. Bit rate of payload conformed to OC-192 (9.95328 Gbps), and a packet included 128 bits preamble and 3814 bits payload, and the duration of a packet was about 400 ns. In this embodiment, two different link utilizations (LU [%]=summarized total duration of packets within a second) of 33% and 0.4% were used. The numerical aperture was 0.18.

The formulas (1) and (2) are approximation formulas unlike in the implementation system. Therefore, there exist residual continuous light and amplified spontaneous emission (ASE). For example, the summation of optical energies forming mark ("1") bits are only 1/50 of total optical energies in the case of LU=0.4%, taking into account that the mark ration of packet is 50:50. The remaining optical energies belong to DC component on space ("0") bits or blank time between packets. Under the circumstances, the energy used for an effective optical pulse is not dominant. On the other hand, the above formula assumes fast switched WDM networks in which the bit stream is continuous, and pumping power for EDF is effectively consumed by an effective optical pulse and an explicit ASE component. However, this embodiment agrees with the above formula, and a more precise and quantitative examination should be a future issue.

Figure 3:
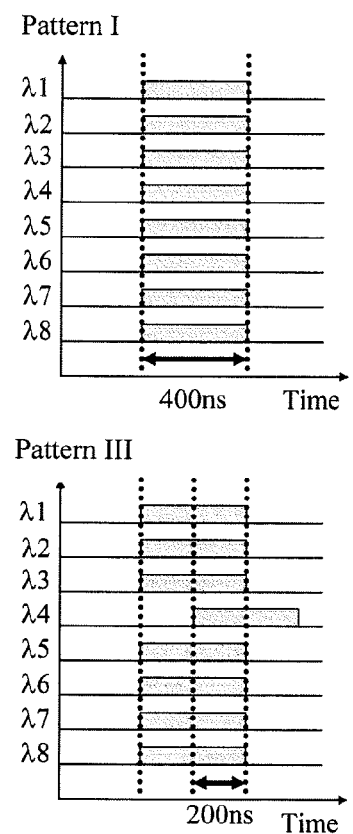
FIG. 3 is a conceptual diagram showing the wavelength and timing allocations of packets in WDM environment.
Figure 3:
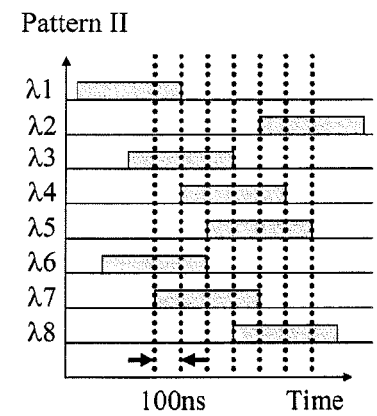
Figure 3:
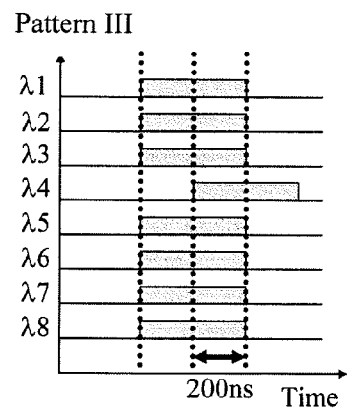
Figure 3:
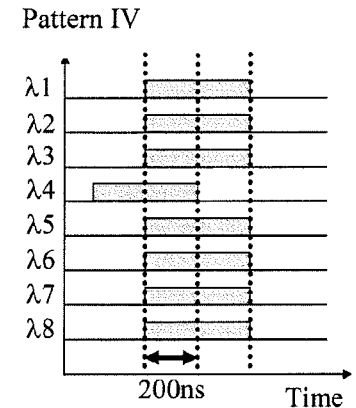

FIG. 3 shows wavelength and timing allocations of packets in several distinctive cases in WDM environment. The packet generator generates 100 GHz spaced eight wavelengths of packets at the same timing (Pattern I). The decorrelated WDM packet was also observed for comparison (Pattern II). The choice of Pattern I and Pattern II should depend on the network architecture from the point of view of the transient response of EDFA.

Since the above formula also indicates that a light intensity on other wavelengths affects the gain excursion, it should be a more serious problem in WDM. In order to consider the effects affected by these other wavelengths, Pattern III and Pattern IV were also observed.

Figure 4:
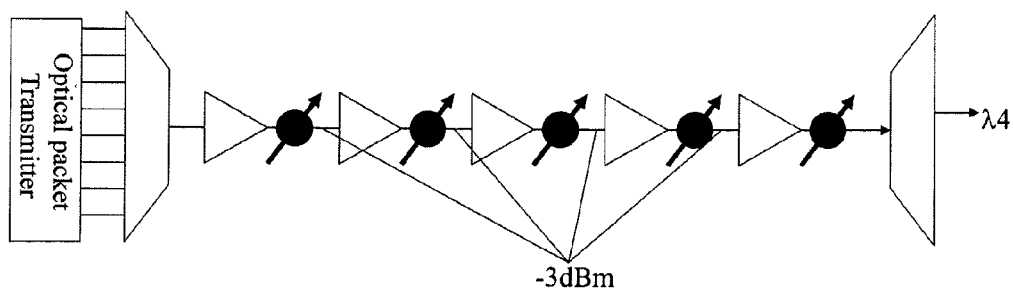
FIG. 4 is a schematic diagram of the apparatus in the embodiment.

FIG. 4 shows a schematic diagram of the device in the embodiment. With regard to the device, a typical optical packet switching (OPS) system using five cascaded EDFA was assumed. This system is also applicable to the other model of optical packet network with several hops. The average optical intensity input into the first EDFA was −8 to −12 dBm depending on the LU and was amplified up to +13 dBm. Then, the optical intensity input into EDFA was attenuated to −3 dBm with 7.6 nm band pass filter and was input into the next EDFA. Each gain of EDFAs was adjusted to 16 dB. For ease of explanation, λ4 (1550.12 nm) only was observed.

For the purpose of reference, a commercial EDFA (Type A) with LU=33%, Pattern I and a commercial EDFA (Type B) with LU=0.4%, Pattern II were also observed. EDFA (Type C) used in the present invention was Pattern III having the diameter of an active region is 4.3 µm.

In conclusion, the EDFA (Type C) in the present invention was most excellent, and Type A was most inferior. Although type B demonstrated the performance similar to that of Type C, it was slightly inferior. Taking LU into consideration, there was no significant impairment except for Type A in case of LU=33%. A slight noise was observed with Type A. On the other hand, in case of LU=0.4%, many impairments were observed. Furthermore, impairment was found to be affected by the number of continuous EDFAs.

Figure 5:
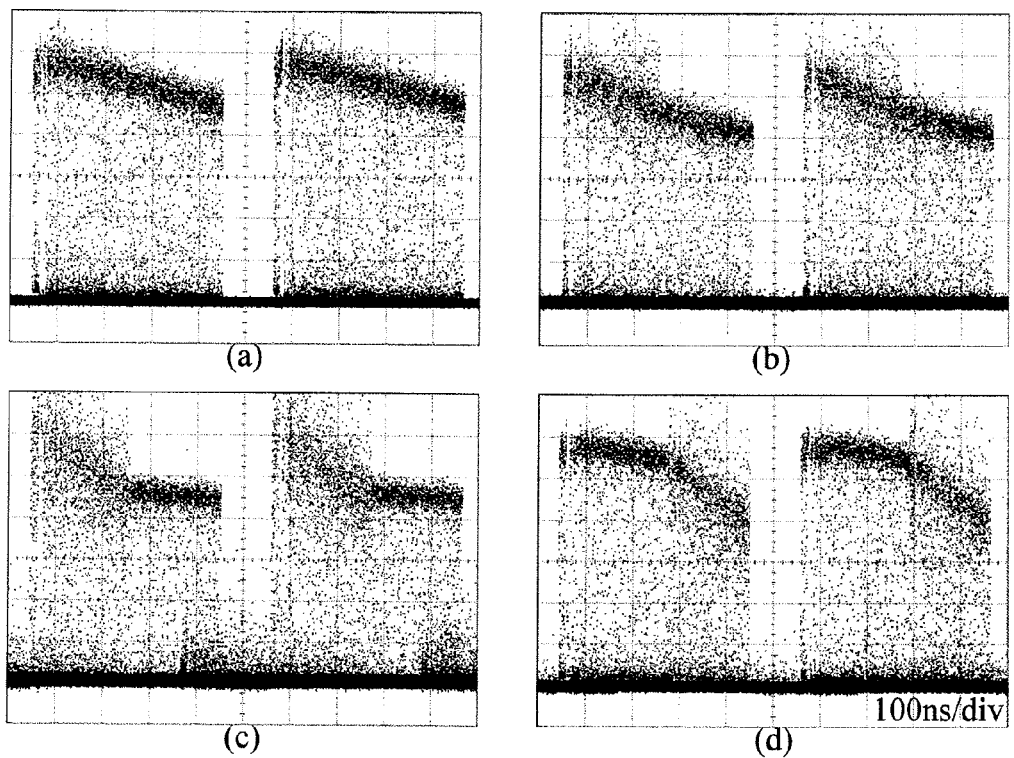
FIG. 5 shows a graph showing impairments derived from gain excursion and crosstalk.

FIG. 5 shows a graph for indicating the impairment derived from a gain excursion and a cross talk. FIG. 5 (a) shows Pattern I, type B, FIG. 5 (b) shows Pattern II, type A, FIG. 5 (c) shows Pattern III, type A, and FIG. 5 (d) shows Type IV, type A.

As shown in FIG. 5 (a), an optical packet suffers from a gain excursion by five continuous EDFAs. Such an impairment is an avoidable problem in present. Although Type B tends to a relatively low excursion but an accumulation of excursions even if all the wavelengths has the same timing.

FIGS. 5(b) to 5(d) show the worst case with type A. FIG. 5b shows an extremely high noise derived from other decorrelated wavelengths. It is clearly shown in FIGS. 5(c) and 5(d) that seven channels other than observed one affect on λ4 when they are dropped or added. To emphasize the impairment, the timing of the seven channels was made the same. This shows that the use of the unoptimized EDFA in WDM environment eventually result in destruction of an optical packet.

Figure 6:
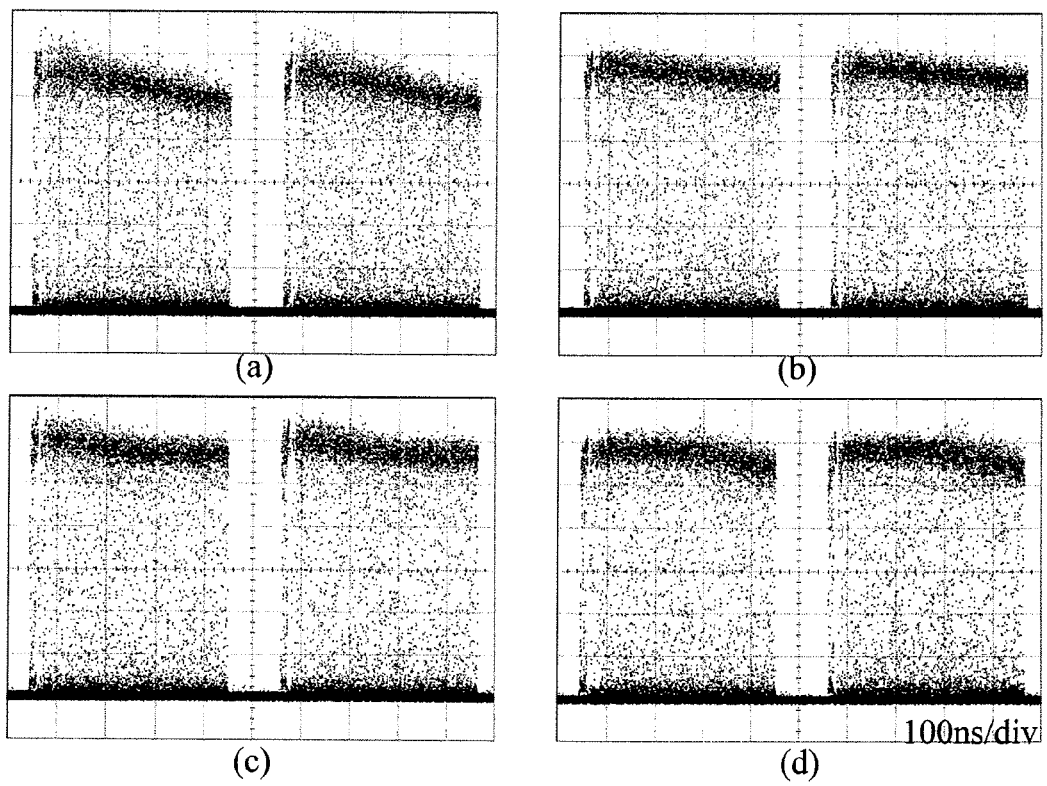
FIG. 6 shows a graph showing the cases corresponding to each case in FIG. 5 in case of using Type C.

The best result was observed in all cases in the embodiment with Type C having a large erbium active region. FIG. 6 shows a graph with Type C corresponding to FIG. 5. FIG. 6(a) shows Pattern I, FIG. 6(b) shows Pattern II, FIG. 6(c) shows Pattern III, and FIG. 6(d) shows Pattern IV.

FIG. 6(a) shows almost the same result as that of FIG. 5(a) but with 30% improvement. Furthermore, FIGS. 6(b) to 6(d) show a slight impairment but no further impairment derived from a cross talk while Type A showed an apparent impairment. This shows that the present invention can certainly mitigate a gain excursion and a cross talk.

Embodiment 2

Figure 11:
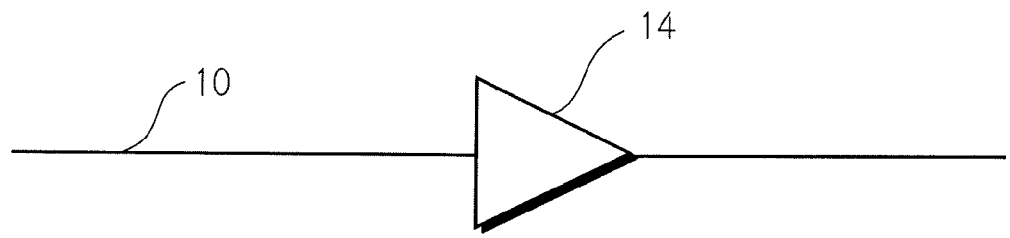
FIG. 11 is a schematic diagram of a rare earth doped fiber with enhanced active region manufactured in order to examine the characteristics of a rare earth doped fiber with enhanced active region.

Examination of Characteristics of a Rare Earth Doped Fiber with Enhanced Active Region The characteristics of a rare earth doped fiber with enhanced active region were examined. FIG. 11 shows a schematic diagram of a rare earth doped fiber with enhanced active region which was manufactured for examining the characteristics of a rare earth doped fiber with enhanced active region. The used fiber amplifier was an erbium doped fiber amplifier which can be used in burst mode. The used fiber amplifier had the active region whose diameter was 7.6 μm and had a length of 3 m to 4 m. The intensity of the input signal was −3 dBm. In order to identify the characteristics of the manufactured fiber amplifier when there is little traffic, a simulation using a computer was performed. The numerical aperture was 0.13.

FIG. 12 shows a graph replaced with a drawing showing the characteristics of a rare earth doped fiber with enhanced active region. FIG. 12 (a) shows the intensity of the signals at each channel, and FIG. 12 (b) shows the form of a rectangular pulse. FIG. 12 (a) shows that the influence of a gain excursion is seen in the signals at each channel when there is little traffic. Furthermore, FIG. 12 (b) shows that there is a slope in a part of the form of the rectangular pulse. Moreover, as for an amplification of a small signal, FIG. 12 shows that a small signal amplification tends to have a higher gain than an amplification in a saturation range.

Embodiment 3

Examination of Characteristics of a System Comprising an Overpumping Light Source, Two Rare Earth Doped Fibers with Enhanced Active Region, and an Intermediate Gain Equalizing Filter A system having the configuration as shown in FIG. 10 was constructed, and the characteristics of the system comprising an overpumping light source, two rare earth doped fibers with enhanced active region, and an intermediate gain equalizing filter were examined. The intensity of the overpumping light source was −3 dBm. Two rare earth doped fibers with enhanced active region were the erbium doped fiber amplifiers which can be used in burst mode. And the diameter of the active region was 7.6 μm, the length of the first rare earth doped fiber was 50 cm, and the length of the second rare earth doped fiber was 2 m. The intermediate gain equalizing optical filter was designed and manufactured so as to have the filter property which compensates the gain excursion by the above first and second rare earth doped fibers. A simulation using a computer was performed in order to identify the manufactured system when there is little traffic.

FIG. 13 shows a graph replaced with a drawing showing the characteristics of a system comprising overpumping light source, two rare earth doped fibers with enhanced active region, and an intermediate gain equalizing filter. FIG. 13 (a) shows the intensities of the signals at each channel, and FIG. 13 (b) shows the form of a rectangular pulse. FIG. 13 (a) shows that there is little influence of the gain excursion to the signal of each channel when there is little traffic. Furthermore, FIG. 13 (b) shows that the form of a rectangular pulse is kept generally rectangular. The value of the ordinate of a spectrum differs between FIG. 12 and FIG. 13. This means that the use of an overpump and a gain equalizing optical filter can provide a static gain almost equal to constant value without depending on the average power of incident light.

Embodiment 4

Relationship Between a Numerical Aperture and an Overlap Factor

Next, a simulation of the relationship between a numerical aperture and an overlap factor in the optical wavelength regions of 1530 nm to 1580 nm was carried out.

Figure 16:
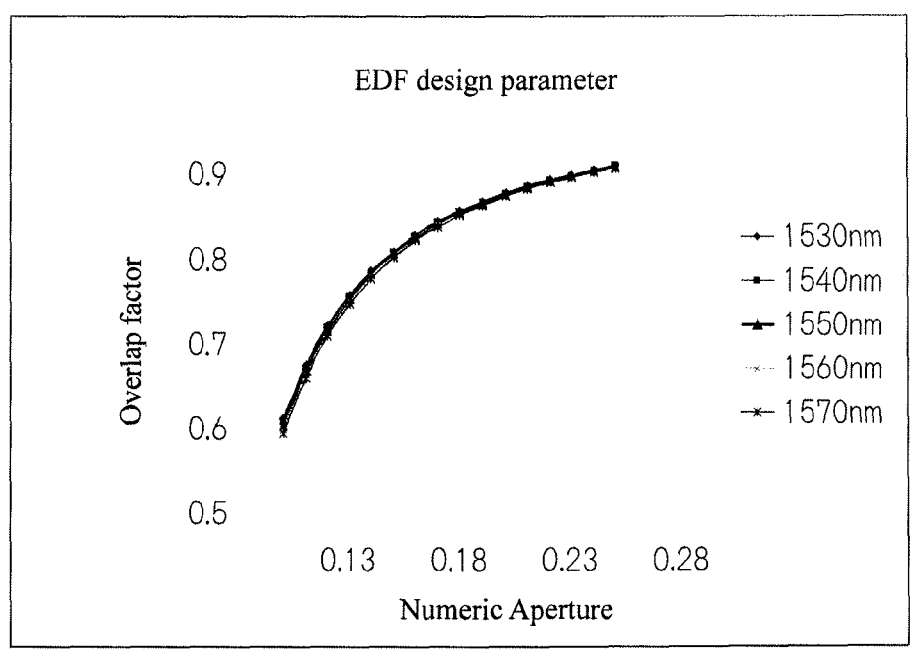
FIG. 16 shows a graph replaced with a drawing which identified the relationship between a numerical aperture and an overlap factor.

FIG. 16 shows a graph replaced with a drawing which identified the relationship between a numerical aperture and an overlap factor. As shown in FIG. 16, in the regions of 1530 nm to 1580 nm, it turns out that an overlap factor can be effectively decreased by making a numerical aperture less than or equal to 0.2. Particularly when a numerical aperture is made less than or equal to 0.13, it turns out that an overlap factor can be decreased rapidly.

INDUSTRIAL APPLICABILITY

An erbium doped fiber amplifier in the present invention can be used in the field of optical information communication etc. Furthermore, an erbium doped fiber amplifier in the present invention, combined with the electric controlling methods conventional in the art, can also constitute a gain excursion suppression optical amplifier with a larger time response.

The invention claimed is:

1. A method for amplifying an intensity of an optical packet signal using an amplifier for optical packet communication comprising a rare earth doped fiber having an active region whose diameter is between 6 μm and 10 μm, inclusive, the length of the rare earth doped fiber being between 1 m and 3 m, inclusive, the numerical aperture of the rare earth doped fiber is less than or equal to 0.2, the method comprising the steps of:
   inputting an optical packet to the fiber amplifier; and
   amplifying the intensity of the optical packet input to the fiber amplifier.

2. A method for amplifying an optical packet comprising, in this order, the steps of:
   the optical packet entering a first rare earth doped fiber;
   the optical packet entering a gain equalizing filter which is connected to the first rare earth doped fiber; and
   the optical packet entering a second rare earth doped fiber which is connected to the gain equalizing filter;
   wherein the gain equalizing filter adjusts the intensity of each wavelength channel of the optical packet so as to equalize the light intensity of each wavelength channel output from the second rare earth doped fiber and compensates gain excursion of the first and the second rare earth doped fiber to each wavelength channel of the optical packet.

3. The method in accordance with claim 1, wherein the rare earth doped fiber is a single mode fibre.

* * * * *